Oct. 2, 1923.
F. B. NAYLOR
1,469,677
CHICKEN FEEDER
Filed March 12, 1923        3 Sheets-Sheet 1
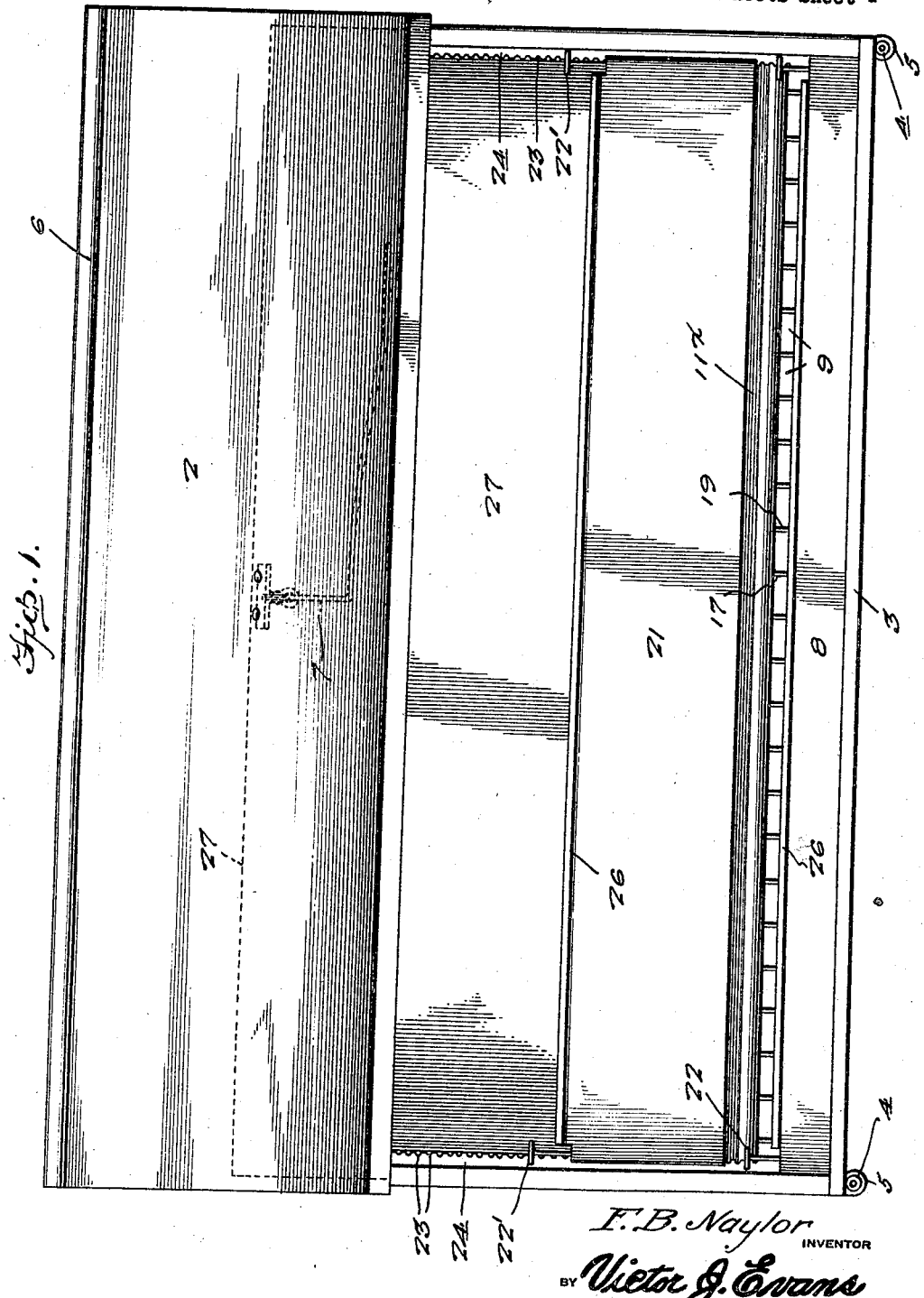
F. B. Naylor
INVENTOR
BY Victor J. Evans
ATTORNEY Oct. 2, 1923.
F. B. NAYLOR
CHICKEN FEEDER
Filed March 12, 1923
1,469,677
3 Sheets-Sheet 2
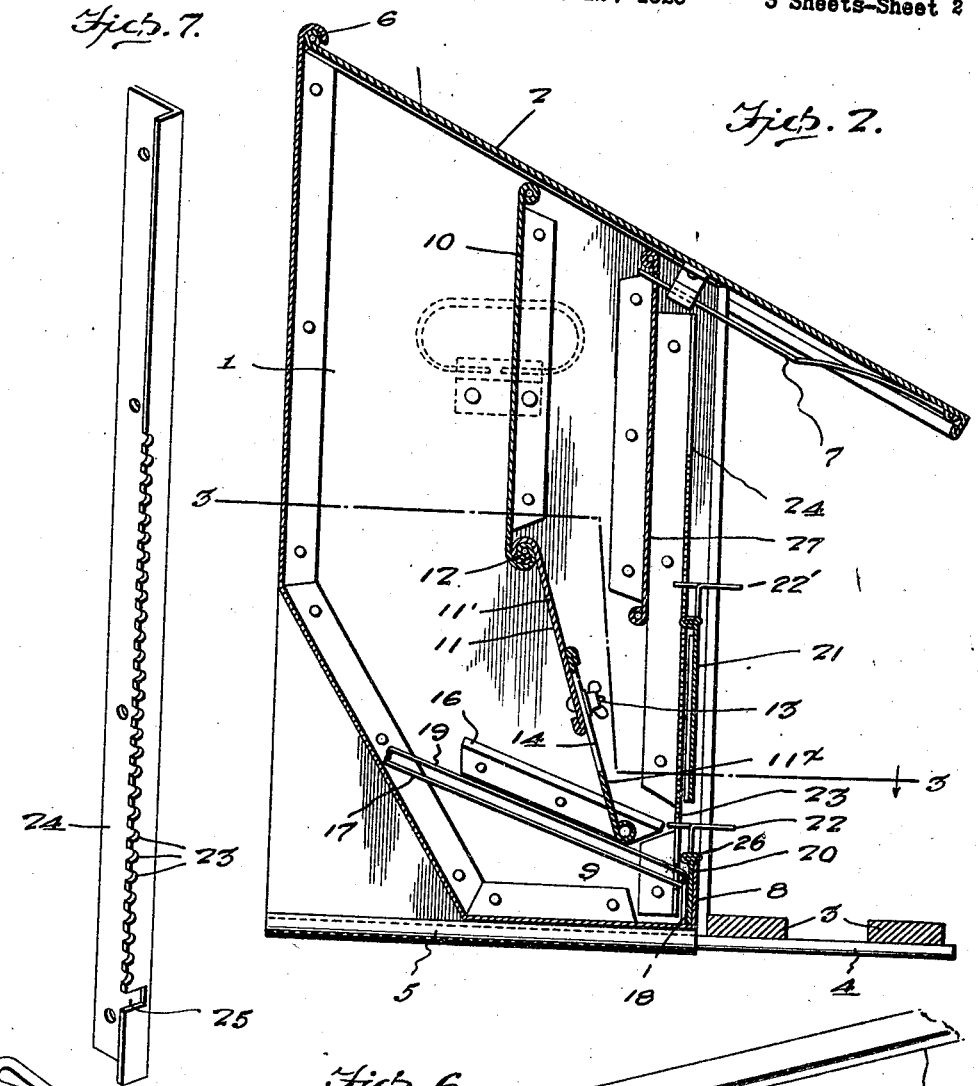
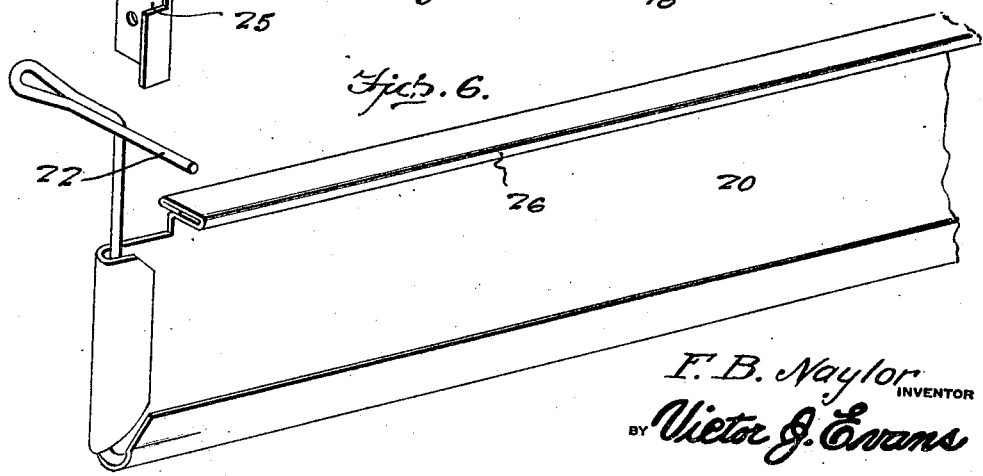
F. B. Naylor, INVENTOR
BY Victor J. Evans
ATTORNEY Oct. 2, 1923.
F. B. NAYLOR
1,469,677
CHICKEN FEEDER
Filed March 12, 1923    3 Sheets-Sheet 3
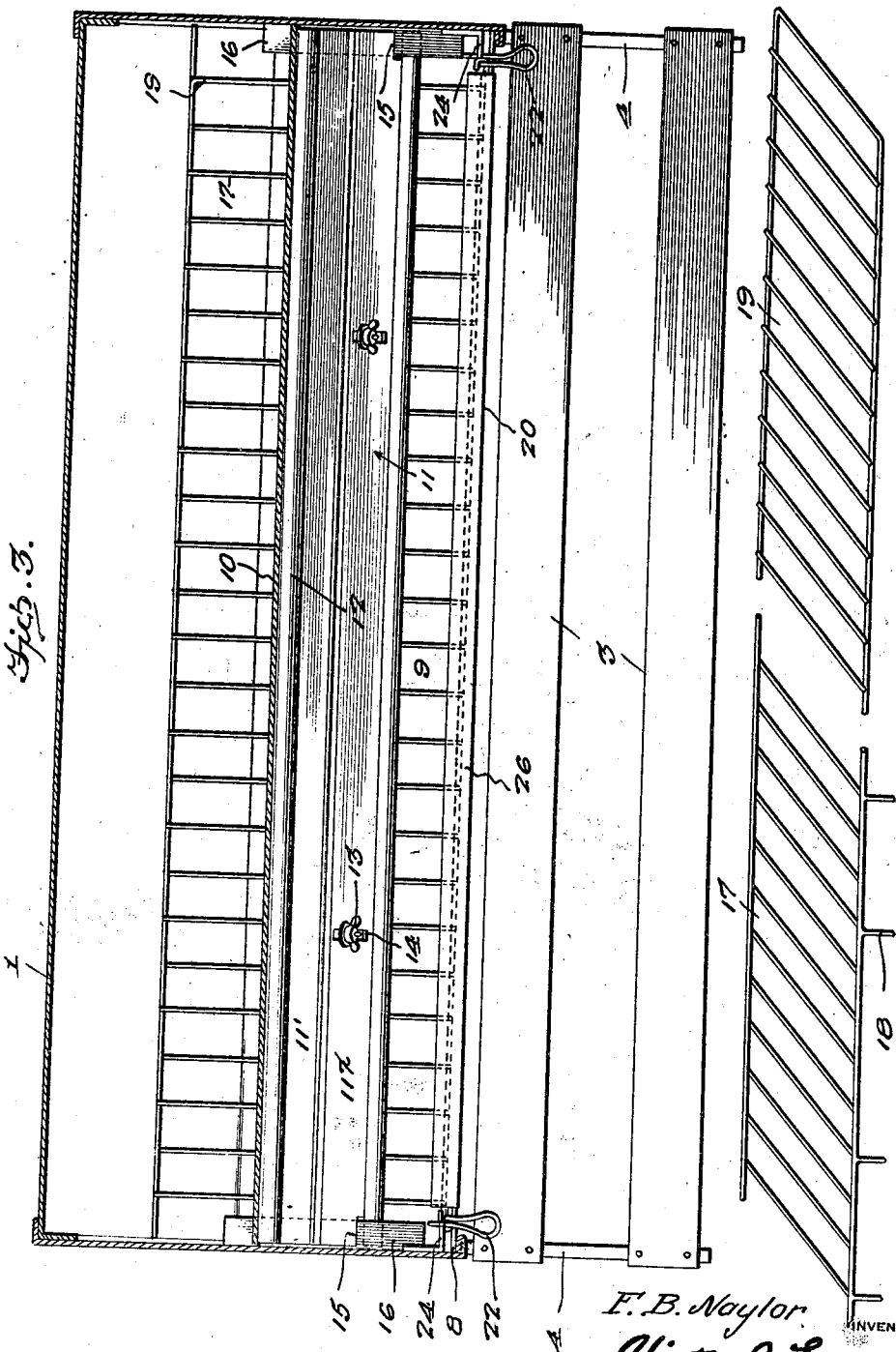
F. B. Naylor INVENTOR
BY Victor J. Evans
ATTORNEY Patented Oct. 2, 1923.

1,469,677

UNITED STATES PATENT OFFICE.

FREDERICK B. NAYLOR, OF ALLENTOWN, NEW JERSEY.

CHICKEN FEEDER.

Application filed March 12, 1923. Serial No. 624,486.

*To all whom it may concern:*

Be it known that I, FREDERICK B. NAYLOR, a citizen of the United States, residing at Allentown, in the county of Monmouth and State of New Jersey, have invented new and useful Improvements in Chicken Feeders, of which the following is a specification.

This invention relates to a feed hopper for poultry, one of the objects of the invention being to provide means for preventing the waste of feed by the poultry pulling the same out of the trough part of the device and scattering it upon the ground or floor.

Another object of the invention is to make the parts adjustable so that the device can be used for poultry of different sizes from young chicks up to full grown chicks.

A further object of the invention is to so construct the hopper that it will be weather proof and rodent proof.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a front view of the invention.

Figure 2 is a sectional view thereof.

Figure 3 is a section on line 3—3 of Figure 2.

Figure 4 is a view of one of the wire frames for covering the trough.

Figure 5 is a view of the second frame covering the trough.

Figure 6 is a perspective view of a portion of one of the gates.

Figure 7 is a perspective view of one of the rack bars for holding the gates in adjusted position.

In these views 1 indicates the body of the hopper and 2 the cover thereof, said cover sloping downwardly towards the front of the hopper and being extended to cover the perches 3 which are carried by the rods 4 which are slidably mounted in the tubular members 5 which are formed by rolling projecting parts of the walls of the hopper. Thus the perches can be adjusted towards and away from the hopper. The cover is connected with the rear side of the hopper by the hinge 6, said hinge being formed of rolled parts on the hopper and cover which telescope with one another so as to provide a weather proof joint. The cover is also provided with the latch means 7 for holding it in closed position. A front wall 8 extends up from the bottom of the hopper and this front wall is low enough to permit small chicks to feed from the trough part 9 of the hopper when standing upon the inner perch 3. The front wall of the feed compartment is formed of the strip 10 which has its flanges riveted or otherwise secured to the hopper, and the flap 11 being hingedly secured to the lower part of the strip 10 by means of the rolled parts 12 on the flap and lower end of the strip which telescope one another to form a hinge. The flap 11 is formed of two parts 11′ and 11ˣ which are adjustably connected together by the bolts and wing nuts 13 passing through holes in one part and slots 14 in the other part. The end edges of the part 11ˣ are provided with slots 15 for engaging the inclined guides 16 on the ends of the hopper. By this means the space between the front wall 8 and the flap can be adjusted so as to regulate the amount of feed exposed in the trough part 9. A frame 17, composed of wires and provided with legs 18 at the front thereof, is placed over the trough part and a second wire frame 19 is slidably mounted upon the first frame so that by adjusting one frame upon the other the spaces between the cross bars of the frame can be made full width or of half width. These frames prevent the poultry from wasting the feed in the trough part as they cover the feed therein.

I also provide means for regulating the size of the opening through which the chicken passes its head and neck. Such means consists of a lower gate 20 and an upper gate 21, these gates 20 and 21 having spring latch means 22 and 22′ respectively at their ends for engaging the teeth 23 on the angle bars 24 which are riveted or otherwise secured to the ends of the hopper. Notches 25 are formed in the lower ends of the angle bars for receiving the latch of the lower gate for holding the means of the lower gate for holding the same in its lowest position with its lip 26 resting upon the upper edge of the front wall 8. In this position little chicks can feed from the device. The angle bars 24 are placed directly in front of the front strip 27 which is riveted or otherwise secured to the ends of the hopper and is spaced from the strip 10.

From the above it will be seen that the front and rear walls and the end walls form a trough into which the feed in the device will enter as the feed is consumed from the trough. The amount of feed exposed in said trough can be regulated by adjusting the flap 11 towards and away from the front of the trough and it is covered by the wire frames 17 and 19, the extent to which these frames cover the feed being regulated by moving one frame upon the other. The flap is adjusted by first loosening the nut 13 and then either pushing the flap towards the rear or towards the front of the device, the guides 16 engaging the notch 15 in the lower part of the flap causing the same to move vertically and thus the lower end of the flap is kept adjacent the frame 19. After the flap has been adjusted the nut is tightened to hold it in position. If the device is being used for small chicks one frame is adjusted upon the other so that the cross bars of one frame are alternately arranged with those of the other frame but if the device is used for large chickens the cross bars of one frame are placed over those of the other so that the spaces between the cross bars are of the maximum size. The opening through which the chicken passes its head and neck is also adjustable by moving the gate 21 towards or away from the gate 20 and the gate 20 can be adjusted to regulate the depth of the trough and thus prevent the waste of feed by the chickens pulling the same over the front of the trough. The perches are also adjustable by moving the bars 4 in and out of the rolled parts to suit chickens of different sizes.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A poultry feeder of the class described comprising a hopper having a trough part, a lower gate, means for adjusting the same vertically, an upper gate having its lower edge spaced from the lower gate to form an opening to permit the chicken to pass its head into the trough part and means for adjusting the upper gate vertically.

2. A poultry feeder of the class described comprising a hopper having a trough part, a lower gate, means for adjusting the same vertically, an upper gate having its lower edge spaced from the lower gate to form an opening to permit the chicken to pass its head into the trough part, means for adjusting the upper gate vertically; such means consisting of rack bars and spring members on the gates for engaging the same.

3. A poultry feeder of the class described comprising a hopper having a trough part, a flap hinged to the front wall of the feed compartment and extending over the top of the trough, a guide for the lower part of the flap, and means for adjusting the width of the flap.

4. A poultry feeder of the class described comprising a hopper having a trough part, a flap hinged to the front wall of the feed compartment and extending over the top of the trough, a guide for the lower part of the flap, means for adjusting the width of the flap, such means consisting of a pair of overlapping parts forming a flap, one part having slots therein, bolts passing through one part and the slots in the other part and nuts engaging the bolts for clamping the two parts together in adjusted position.

5. A poultry feeder of the class described comprising a hopper, a trough part, a vertically adjustable lower gate associated with the front of the trough part, a vertically adjustable upper gate arranged above the lower gate, a telescopic flap hingedly connected with the lower edge of the front wall of the feed chamber, an inclined guide for the lower part of the flap, a wire frame covering the trough part and located below the flap and a second frame slidably mounted on the first frame.

In testimony whereof I affix my signature.

FREDERICK B. NAYLOR.